UNITED STATES PATENT OFFICE.

OTTO N. WITT, OF WESTEND, NEAR BERLIN, ASSIGNOR TO THE BADISCHE ANILIN AND SODA FABRIK, OF MANNHEIM, GERMANY.

MANUFACTURE OF PURPLE-BLACK AZO DYE-STUFF.

SPECIFICATION forming part of Letters Patent No. 381,045, dated April 10, 1888.

Application filed January 28, 1888. Serial No. 262,266. (Specimens.)

*To all whom it may concern:*

Be it known that I, OTTO N. WITT, doctor of philosophy, a citizen of Switzerland, residing at Westend, near Berlin, in the Kingdom of Prussia and Empire of Germany, have invented new and useful Improvements in the Manufacture of a Purple Coloring-Matter or Dye-Stuff, of which the following is a specification.

This invention relates to the manufacture of a purple coloring-matter or dye-stuff of the class commonly known as "azo" dye-stuffs.

To carry out my invention I proceed as follows: I take 18.5 parts, by weight, of binitro-aniline of the modification known to chemists as the "assymmetrical" one, discovered by Gottlieb, and melting at 180° centigrade. I then transform the said binitro-aniline into its diazo derivative by using any or either of the well-known methods for the purpose. As an example, I describe the following method (without, however, limiting myself to its exclusive use.) I introduce the before-named quantity of binitro-aniline into one hundred parts, by weight, of ordinary concentrated or rectified sulphuric acid, in which previously either 6.9 parts, by weight, of sodic nitrite, or 3.8 parts, by weight, of nitrous anhydride have been dissolved. When all the binitro-aniline has been taken up and dissolved by the acid, I pour the solution thus obtained upon chopped ice, and in this manner I prepare an aqueous solution of binitro-diazo-benzine sulphate. On the other hand, I dissolve 26.5 parts, by weight, of beta-naphthylamine monosulphonate of sodium, of the modification commonly known as "Brönners," together with one hundred and sixty-five parts, by weight, of sodic acetate (taken as dry) in about one thousand parts of water. To this solution I add, in the cold, the solution of binitro-diazo-benzine sulphate, prepared as above described, stirring the liquid vigorously while the mixture takes place.

The dye-stuff is formed at once and settles out in the shape of a dark-purple precipitate, which may be collected and purified by being redissolved in hot water and precipitated from this solution by the addition of salt-water. The dye-stuff thus obtained forms in its dry state a black powder, which dissolves readily in boiling water with a deep-purple color. This solution remains liquid on cooling, if the dye-stuff be quite pure. If, however, even a small quantity of an alkali be present, the solution solidifies into a gelatinous mass of brownish-red color, which becomes liquid and purple on renewed heating. Acid solutions of the dye-stuff do not gelatinize on cooling. Concentrated sulphuric acid dissolves my new dye-stuff with a dark-orange color. Hot and concentrated hydrochloric acid acts in the same manner. On cooling, the free azo acid settles out in the shape of orange flakes.

In the above process the sodic beta-naphthylamine monosulphonate (Brönner's modification) may be replaced partly or wholly by the sodium salt of the so-called delta-mono sulphonic acid of beta-naphthylamine without materially altering the result obtained. If, however, any of the other isomeric beta-naphthylamine sulphonates known at the present time be used, then the result is no longer the same, dye-stuffs of a brownish shade being formed.

My new dye-stuff dyes either wool or silk from an acidulated dye-bath in purple shades of considerable depth and body.

What I claim as new, and desire to secure by Letters Patent, is—

The purple azo dye stuff hereinbefore described, which forms in a dry state a black powder and dissolves readily in boiling water, forming a solution of a deep purple color, which remains liquid on cooling, if the dye-stuff be quite pure; but if a small quantity of an alkali be present said solution on cooling solidifies into a gelatinous mass of brownish-red color, which becomes liquid and purple on renewed heating.

In testimony whereof I have hereunto set my hand in the presence of two subscribing witnesses.

OTTO N. WITT.

Witnesses:
ERNST HEIM,
B. ROI.